D. & A. S. MARKHAM & D. ELDRED.
Wheel-Cultivator.
No. 23,182.  Patented Mar. 8. 1859.
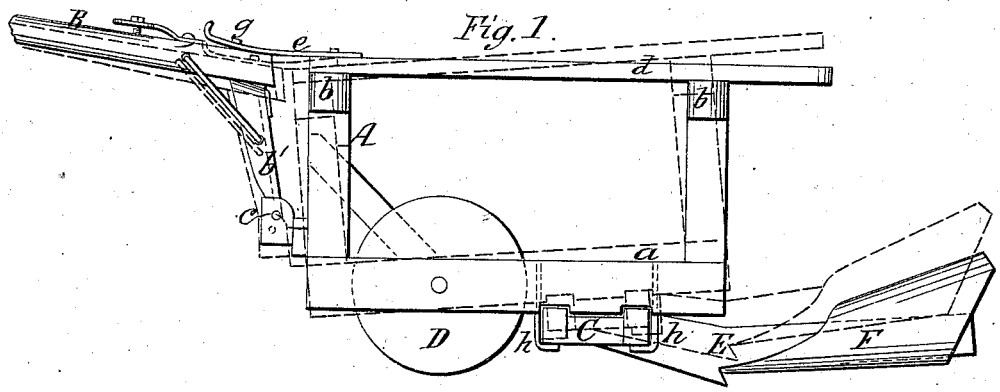
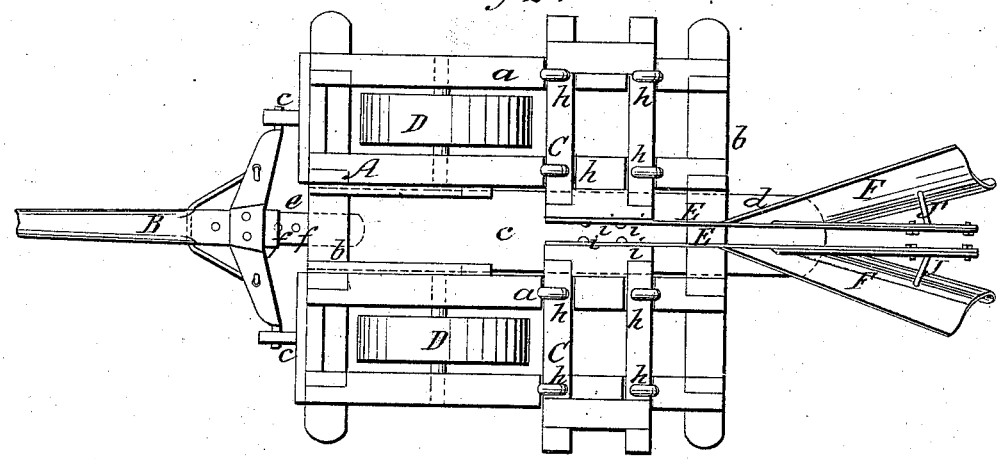
Witnesses.
James McCay
P. S. Reynolds
Inventors.
Daniel Markham
A. S. Markham
David Eldred

UNITED STATES PATENT OFFICE.

DANL. MARKHAM, A. S. MARKHAM, AND D. ELDRED, OF MONMOUTH, ILL.

IMPROVEMENT IN CULTIVATORS.

Specification forming part of Letters Patent No. 23,182, dated March 8, 1859.

*To all whom it may concern:*

Be it known that we, DANIEL MARKHAM, A. S. MARKHAM, and DAVID ELDRED, all of Monmouth, in the county of Warren and State of Illinois, have invented a new and Improved Cultivator; and we do hereby declare that the following is a full, clear, and exact description of the same, reference being had to the annexed drawings, making a part of this specification, in which—

Figure 1 is a side view of our invention. Fig. 2 is an inverted plan or top view of the same.

Similar letters of reference indicate corresponding parts in the two figures.

The object of this invention is to obtain a cultivator whereby corn and other "hoed" crops may be cultivated until they attain a considerable height without being thrust down or at all injured by the cultivator, and the parts of the implement so arranged that it may be readily manipulated for perfect operation. By this invention the cultivator may be much more used than hitherto, and a more perfect cultivation of the crop and a consequent increase of yield obtained.

To enable those skilled in the art to fully understand and construct our invention, we will proceed to describe it.

A represents a rectangular frame, which is formed of two parts, $a\ a$, connected by traverse-bars $b$, a suitable space, $c$, being allowed between the two parts $a\ a$. The draft-pole B is attached to the frame A by two pendent hounds, $b'\ b'$, said hounds being attached to the parts $a\ a$, one to each, by joints $c$, as shown clearly in Fig. 2, the hounds being attached to the parts $a\ a$ near their lower ends, as shown clearly in Fig. 1, and the draft-pole being in line with the space $c$.

On the upper part of the frame A, directly over the space $c$, a longitudinal board, $d$, is placed, said board being the driver's seat, and to the front end of this board a metal plate, $e$, is attached. This plate has some degree of elasticity, and a number of holes, $f$, are made through it, through either of which a pin, $g$, on the back part of the draft-pole B passes and secures the back end of the pole directly to the frame A.

To the under side of each portion $a$ of the frame A a sliding frame, C, is secured, as shown clearly in Fig. 2. These frames are both shown in Fig. 2, and they are fitted in guides $h$, so that they may be adjusted nearer to and farther from each other and secured in the desired position by any proper means.

The frame A is mounted on wheels D D, which are nearer to the front than to the back part of the frame A, a wheel being in each portion $a$, as shown in Fig. 2, and to the inner side of each adjustable or sliding frame C a bar, E, is permanently attached by bolts $i$. The bars E extend out a considerable distance from the back end of the frame A, and to each bar a plow or share, F, is attached by bolts $j$. These plows or shares may be attached to either side of the bars at their outer parts, as shown in both figures. The bars E have a cutting-edge at their lower parts to serve in a degree as colters and cut all weeds and substances that may lie in the path of the plows.

The operation is as follows: As the machine is drawn along, the animals forming the team are one at each side of the row under cultivation, and a portion or part, $a$, of the frame A, and also a plow, F, are at each side of the row, the space $c$ being sufficiently wide to allow the machine to pass along without injuring the crop, and the seat $d$ being sufficiently high to be free from the crop, the frame A being made with a view to this end. The sliding frames C are adjusted so that the plows F may work the proper distance from the crop and the plows attached to the bars E, so as to throw the earth to or from the crop. The plows are made to enter the earth at a greater or less distance by regulating the attachment of the frame A to the draft pole B by the plate $e$ and pin $g$, and the plows may be raised entirely out of the ground by the driver moving forward on the seat $d$, so that his weight will tilt up the back part of frame A, the plate $e$ yielding upward on account of said movement of the frame, and the pin $g$ catching into the innermost hole of plate $e$, which retains the frame A in an inclined position and the plows F in an elevated state, as shown in red, Fig. 1.

It will be seen that the crop may be cultirated so long as the seat or board $d$ will not touch the plants, and that the device is under the control of the attendant, the plows or shares being adjusted by the driver shifting his position on the seat or board $d$.

Having thus described our invention, what we claim as new, and desire to secure by Letters Patent, is—

The frame A, formed of two parts, $a\ a$, connected by the traverse-bars $b$, and provided with the sliding or adjustable frames C C, with the bars E and plows F attached, substantially as and for the purpose set forth.

DANIEL MARKHAM.
A. S. MARKHAM.
DAVID ELDRED.

Witnesses:
   JAMES McCOY,
   P. E. REYNOLDS.